United States Patent [19]

Potochnik

[11] Patent Number: 5,491,928
[45] Date of Patent: Feb. 20, 1996

[54] DUAL CONTAINER FOR HOUSE PLANTS

[76] Inventor: Ann L. Potochnik, Rte. 1, Box 479, Muldrow, Okla. 74948

[21] Appl. No.: 378,204

[22] Filed: Jan. 24, 1995

[51] Int. Cl.⁶ .................................................. A01G 27/00
[52] U.S. Cl. .............................. 47/79; 215/332; 220/501; 220/298
[58] Field of Search ........................ 220/293, 298, 220/301, 23.86, 501; 215/332, 6; 47/75 N, 79, N, 81 N, 75 V

[56] References Cited

U.S. PATENT DOCUMENTS

| | | | |
|---|---|---|---|
| 153,715 | 8/1874 | Landers | 67/71 |
| 586,485 | 7/1897 | Guyn | 47/75 N |
| 2,722,779 | 11/1955 | Allderdice | 47/38 |
| 3,371,817 | 3/1968 | Gasbarra | 220/298 |
| 4,265,050 | 5/1981 | Buescher | 47/79 |
| 4,346,532 | 8/1982 | Peterson | 47/66 |
| 4,885,870 | 12/1989 | Fong | 47/79 V |
| 4,991,346 | 2/1991 | Costa | 47/79 N |
| 5,044,119 | 9/1991 | Hougard | 47/66 |

FOREIGN PATENT DOCUMENTS

| | | | |
|---|---|---|---|
| 441019 | 2/1927 | Germany | 220/293 |
| 415158 | 8/1934 | United Kingdom | 220/293 |
| 954175 | 4/1964 | United Kingdom | 47/79 V |
| 2207591 | 2/1989 | United Kingdom | 47/81 N |

*Primary Examiner*—Henry E. Raduazo
*Attorney, Agent, or Firm*—Robert K. Rhea

[57] ABSTRACT

A dual wall plant container for collecting excess water draining from root containing soil medium is formed by a pair of telescoped plant containers having different depths and cooperating lip and lug members lockably releasably engaged and projecting radially outward from their upper rims for supporting the inner container bottom wall in spaced relation with respect to the outer container bottom wall to form a liquid containing reservoir in the space therebetween.

4 Claims, 1 Drawing Sheet

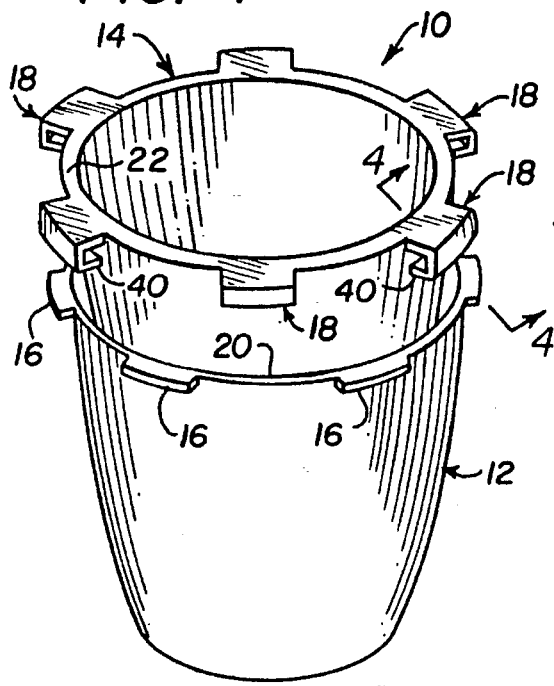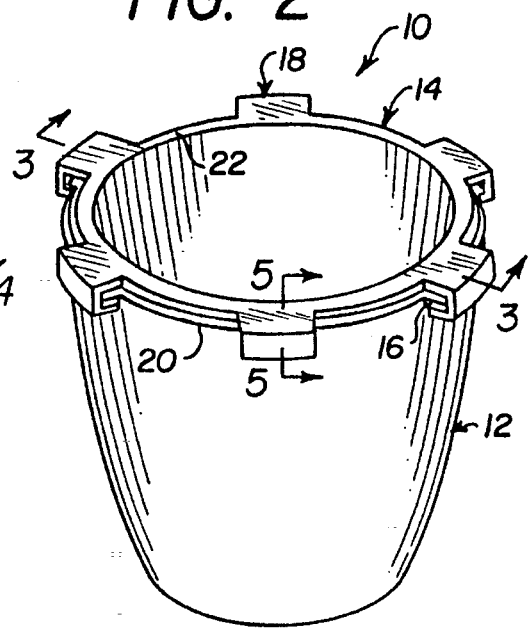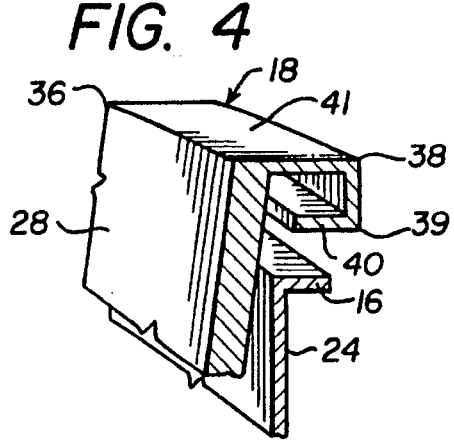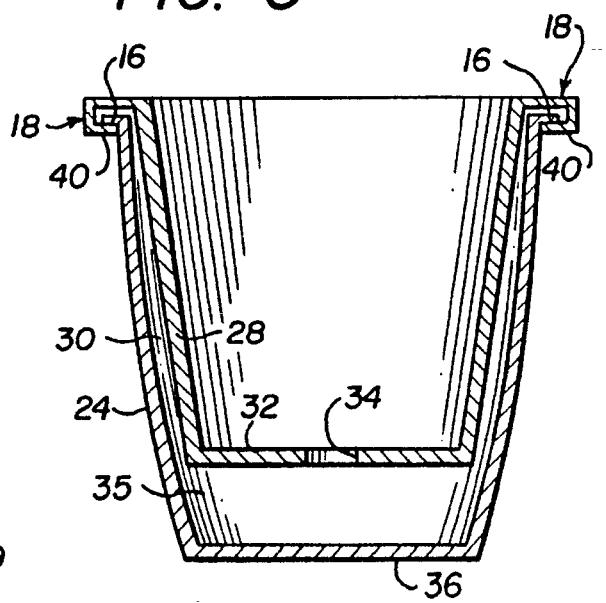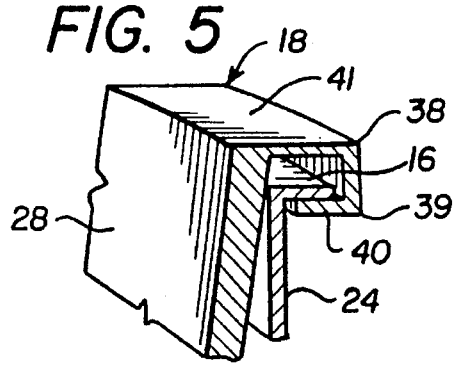

DUAL CONTAINER FOR HOUSE PLANTS

BACKGROUND OF THE INVENTION

1. Field of the invention.

This invention relates to flower pots and more particularly to dual interlocking containers for potted plants.

It is well known that the health of foilage plants depends primarily on the quantity of water in the soil. Without sufficient moisture in the vicinity of plant roots in the plant radium, maintaining plant growth and vigor becomes extremely difficult. Often time plants are overwatered in an effort to compensate for the lack of humidity in the immediate vicinity of the plant environment which would encourage healthy development of plants.

This overwatering drowns the root structure of the plant resulting in water logging and stagnation which is detrimental to plant life and growth.

It is highly desirable therefore, to provide a manner of watering plants and yet prevent water stagnation in the bottom portion of plant pots or containers particularly where the roots are.

Many different methods have been employed for drainage of excess water applied to a potted plant, but generally all such devices suffer from certain disadvantages and shortcomings requiring extensive maintenance or immediate attention for draining containers at the bottom of the plant which generally holds a limited amount of excess water applied to the plant.

The device of this invention overcomes these disadvantages and shortcomings and provides a dual wall container formed by separable containers which retains excess water draining from the inner container and enhances the relative humidity surrounding the foilage by evaporation of the excess water.

2. Description of the prior art.

Dual wall plant containers are well known and are exemplifed pay the following patents: U.S. Pat. No. 153,715 issued Aug. 4, 1874 to Landers for FLOWER-POTS, U.S. Pat. No. 2,722,779 issued Nov. 8, 1955 to Allderdice for POT FOR GROWING PLANTS UNDER WATER CULTURE, and U.S. Pat. No. 4,265,050 issued May 5, 1981 to Buescher for FLOWER POT WITH CONTROLLED MOISTURE.

These patents generally disclose a smaller pot disposed within a larger outer pot in which water draining from the soil medium within the inner pot passes into the outer pot and usually includes a saucer or shallow pan which collects and retains excess moisture draining from the pots or as in the Buescher patent the flower container may be a unitary member having hollow walls and a bottom drainage which passes excess water to a saucer-like shallow pan underlying the unitary container.

U.S. Pat. No. 4,346,532 issued Aug. 31, 1982 to Peterson for PLANTER and U.S. Pat. No. 5,044,119 issued Sep. 3, 1991 to Hougard for FLOWERPOT BOWL are believed good examples of the further state-of-the-art.

The Peterson patent disclosing a unitary divided flower pot in which one compartment of the pot receives excess moisture from the soil containing compartment and evaporates it to the atmosphere through upwardly open apertures.

The Hougard patent discloses dual flower pots, one disposed within the other with the inner pot bottom resting on the bottom of the outer pot and forming an annulus between the pot walls which collects moisture falling from above and evaporates it to the atmosphere for enhancing the humidity within the vicinity of the contained plant.

This invention is distinctive over the above patents by providing a dual wall plant container in which an inner container defines an annulus between adjacent walls of the containers and is supported within the outer container in releasable interlockable relation by lugs on the top rims of the containers.

SUMMARY OF THE INVENTION

A substantially cup-shaped imperforate flat bottom outer container having an upper rim characterized by a circumferentially interrupted annular outstanding flange forming a plurality of radial lips substantially normal to the cylindrical plane of the top wall portion of the outer container.

The outer container surrounds the wall and underlies the bottom of a cooperatively configured inner container forming an annular space between the container walls. The top rim of the inner container is characterized by a like plurality of radially outward directed rim lip supporting split sleeve-like segments or lugs nesting and supporting the horizontal lips of the outer container.

The principal object of the invention is to provide a dual wall plant container formed by inner and outer containers having spaced apart walls forming an annulus open to the atmosphere and an excess water collecting compartment in the bottom portion of the outer container below the bottom of the inner container in which such excess water evaporates to the atmosphere through the upwardly open annulus between the container walls and in which the containers are releasably locked by cooperating lips and lugs on their respective upper rims which provide hand-hold ledges for lifting and moving the containers.

BRIEF DESCRIPTION OF THE DRAWINGS

FIG. 1 is a partially exploded perspective view of the containers;

FIG. 2 is a similar perspective view illustrating the containers in locked relation;

FIG. 3 is a vertical cross sectional view taken substantially along the line 3—3 of FIG. 2;

FIG. 4 is a fragmentary exploded perspective view partly in section, to a larger scale, taken substantially along the line 4—4 of FIG. 1; and, FIG. 5 is a view similar to FIG. 4 taken substantially along the line 5—5 of FIG. 2.

DESCRIPTION OF THE PREFERRED EMBODIMENTS

Like characters of reference designate like parts in those figures of the drawings in which they occur.

The reference numeral 10 indicates the containers which are inverted frusto-conical in general configuration comprising an outer container 12 and an inner container 14.

The outer container is provided with a plurality of flange like lips 16 extending through a selected arc of the circumference of the outer container and projecting radially outward from the upper wall edge or limit 20. The inner container is provided with a like plurality lugs 18 adjacent its upper wall edge 22 forming outer container lip supports, as presently explained.

The outer container downwardly converging wall 24 is bowed outward slightly, in the example shown, and terminates in a horizontal imperforate bottom 36. The inner container wall 28 converges downwardly in spaced relation with respect to the outer container wall 24 and forms an annular space 30 between the inner and outer container walls. The inner container wall 28 terminates in a horizontal bottom 32 having at least one aperture 34 and forms a water receiving compartment 35 between the container bottoms.

Referring more particularly to FIGS. 4 and 5, the lugs 18 are similarly formed by extending a like circumferial arc or portion of the inner container wall 28 horizontally outward and downward, as at 36 and 38, and then horizontally inward, as at 39, in downward spaced relation with respect to the upper horizontally outward extending portion 41, a distance at least twice the vertical thickness of the outer container lips 16 to form a shoulder 40. The shoulder 40 terminates in spaced relation with respect to the adjacent outer surface of the wall 24, a distance at least sufficient to permit angular rotative movement of the upper edge portion of the outer container wall 24 relative to the inner container wall 28, as presently explained.

The lugs 18, in combination with the adjacent portion of the inner containers wall 28, forms an open end split sleeve configuration.

Operation

The containers are constructed as described hereinabove and the inner container 14 is manually telescoped into the outer container 12 with the lips 16 and lugs 18 disposed in horizontal staggerd relation. The inner container is supported by the lugs 18 resting on the upper edge 20 of the outer container.

one of the containers is angularly rotated relative to the other container or the two containers may be simultaneously angularly rotated in opposite directions so that the lips 16 of the outer container enter the space in the respective sleeve-like lug 18 of the inner container above the respective shoulder 40 until the respective lip is in overlying relation with respect to the lug shoulder 40. With the lips and lugs in this position, manually lifting the inner container by its lugs also lifts the outer container.

Soil medium, not shown, placed within the inner container and receiving water for a plant therein, neither being shown, drains excess water through the hole 34 into the excess water retaining compartment or resevoir 35. The loose fit between the containers at their upper edge limits 20 and 22 permits evaporation of the excess water in the compartment 35 and provides humidity for the plant.

Obviously the invention is susceptible to changes or alterations without defeating its practicability. Therefore, I do not wish to be confined to the preferred embodiment shown in the drawings and described herein.

I claim:

1. A dual wall plant container, comprising:

an inverted frusto-conical outer member having an imperforate bottom and having a wall having an upper edge portion defining an open top, a plurality of flange-like lips projecting radially outward from the upper limit of the outer member wall upper edge;

an inverted frusto-conical inner member having a wall forming an open top wall edge and having an apertured bottom spaced above the bottom of the outer member to form an excess water reservoir, said inner member having a wall spaced inwardly from the outer member wall to form an annulus between said inner member wall and said outer member wall communicating with the water reservoir; and, a like plurality of lug means projecting radially outward from the inner member top wall edge beyond the cylindrical plane of the perimeter of the outer member wall upper edge for cooperatively receiving said lips and supporting the inner member wall top edge adjacent the plane of the outer member top wall edge.

2. The container according to claim 1 in which the lug means comprises;

an open end split sleeve having a planar wall portion forming a horizontal shoulder projecting toward the adjacent outer surface of the inner member wall.

3. A dual wall plant container, comprising:

an outer container having an imperforate bottom and having a wall having an upper edge portion defining an open top;

a plurality of horizontal lips projecting radially outward from the upper limit of the outer container wall upper edge;

an inner container having a wall forming an open top wall edge loosely disposed within the outer container and having an apertured bottom spaced above the bottom of the outer container to form an excess water reservoir, and, a like plurality of horizontal lug means projecting radially outward from the inner container top wall edge beyond the cylindrical plane of the perimeter of the outer container wall upper edge for cooperatively receiving said lips and supporting said inner container within the outer container.

4. The container according to claim 3 in which the lug means comprises:

an open end split sleeve having a planar wall portion forming a horizontal shoulder projecting toward the adjacent outer surface of the inner container wall.

\* \* \* \* \*